United States Patent [19]

Krantz

[11] Patent Number: 4,963,734

[45] Date of Patent: Oct. 16, 1990

[54] PROTECTION DEVICE FOR SENSOR MEANS

[75] Inventor: Ingemar Krantz, Linkoping, Sweden

[73] Assignee: Saab Missiles Aktiebolag, Linkoping, Sweden

[21] Appl. No.: 429,096

[22] Filed: Oct. 31, 1989

[30] Foreign Application Priority Data

Nov. 18, 1988 [SE] Sweden .................................. 8804167

[51] Int. Cl.⁵ .............................................. H01J 5/02
[52] U.S. Cl. .................................. 250/239; 350/319; 350/587
[58] Field of Search ................ 250/239, 216; 350/319, 350/582, 589, 587

[56] References Cited

U.S. PATENT DOCUMENTS 4,024,397  5/1977  Weiner ................................. 250/216
4,150,875  4/1979  Stachiw et al. ...................... 350/319
4,852,508  8/1989  Takada ................................. 350/319

Primary Examiner—David C. Nelms
Assistant Examiner—Que Tan Le
Attorney, Agent, or Firm—Lowe, Price, LeBlanc, Becker & Shur

[57] ABSTRACT

Disclosed is a protection device for a radiation sensor in a vehicle such as a missile. The protection device comprises a cap mounted on the missile by opposed flanges having a seal therebetween to form a gastight space between the cap and the missile. An attaching device such as a pair of shear pins of unequal resistance is provided between the flanges so that pressurization of the space causes the shearing of first one and then the other of such shear pins so that the cap leaves the vehicle by moving with one component of movement in the direction of sensing and at least another component of movement perpendicular to that direction.

6 Claims, 1 Drawing Sheet

PROTECTION DEVICE FOR SENSOR MEANS

TECHNICAL FIELD

The present invention relates to a protection device for sensor means in a vehicle, preferably an air vehicle, such as a missile.

BACKGROUND ART

In various applications, especially military, thee are vehicles, particularly air vehicles, that are provided with sensors for detecting radiation such as incoming IR-rays, visible light or radar rays, usually in a direction directly opposite to the direction of travel of the vehicle. There is a need for protection devices intended to protect the sensor means up to the moment when it is activated. At that moment the vehicle is usually traveling at a relatively high speed through its medium, air or water. When the sensor means is to be activated the protection device must be removed almost instantaneously in order to permit the sensor means to receive radiation. In view of said relatively high speed through a medium, the speed will exert a force directed opposite to the direction of travel of the vehicle, i.e. it will press the protection device towards the vehicle. At the removal of the protection device said force must be overcome and the protection device be taken from the direction of travel of the vehicle, i.e. away from the active direction of the sensor means, which is usually an axis of symmetry through the sensor means. In addition to meeting these said requirements the protection device must be absolutely reliable in the prevailing operating conditions, i.e. a wide temperature range, exposed to vibrations etc., and must be reasonably inexpensive to manufacture.

DISCLOSURE OF THE INVENTION

According to the invention such a protection device is characterized primarily in that it comprises a support attached in the vehicle with a first flange means surrounding said sensor means about an axis in the active direction of the sensor means, further comprising a cap protecting the sensor means, the cap being provided with a second flange means at which a flexible tightening or sealing means is so arranged, sealing between the limiting surfaces of said flange means, that a substantially gastight space is created, partly limited by said cap, including the sensor means, at which at least one attaching means is so formed and arranged, that a first compressive force on the cap relative to the vehicle, achieved through overpressure generated by a source of gas in said space, brings the cap to perform a movement relative to the sensor means with a component of movement in the active direction and at least one component of movement perpendicular to the active direction, before it is released from the vehicle, the limiting surfaces of the flange means being so formed, that said movement is made possible. Such a protection device well meets the requirements, and can be designed in numerous different manners within the scope of the above-mentioned main principle.

In order to make said movement possible, at least either of the limiting surfaces of the flange means for at least a portion of its circumference can be generated by a line inclined relative to the axis, or by a non-linear, i.e. curved line. In a suitable embodiment one or both limiting surfaces are formed as frustums of a cone, i.e. its inner and outer side. The first flange means, i.e. that which constitutes a part of said support attached in the vehicle, can naturally be formed either with an outer limiting surface as a frustum of a cone, or with an inner limiting surface as a frustum of a cone in the opposite direction, the second flange means in the respective cases being formed with a limiting surface that admits said movement. It is naturally possible to form the flange means with cylindrically generated limiting surfaces, provided that the play between them allows said movement without hindering it.

Different embodiments of one or more attaching means are conceivable within the scope of the invention. Although it is fully possible to design the protection device with one single attaching means, it is more suitable to arrange at least two attaching means. In such an embodiment the attaching means are preferably diametrically arranged, in the form of a first and second shear pin in recesses in the first and the second flange means, respectively, with their directions substantially perpendicular to said axis, the first shear pin showing substantially better resistibility towards shearing than the second shear pin. This difference in resistibility can naturally be achieved either by shear pins made of the same material but with different dimensions in the shearing direction, or by them being made of different materials having different shearing strength. Under the effect of the force which is achieved by means of a source of gas, the weakest pin will be sheared off first, whereby the component of movement of the cap can, perpendicular to the active direction is created. Not until then is the second shear pin sheared off and the cap can be entirely released from the vehicle. In a preferred embodiment of the protection device according to the invention the limiting surfaces show such a dimension in said active direction, and the tightening or sealing means is so arranged, that the cap is allowed a certain acceleration movement relative to the vehicle before being released from it.

BRIEF DESCRIPTION OF DRAWINGS

The invention will now be described in more detail with reference to the accompanying FIGURE of drawing, which shows a longitudinal section through a protection device according to the invention.

BRIEF DESCRIPTION OF THE PREFERRED EMBODIMENT

Figure 1:
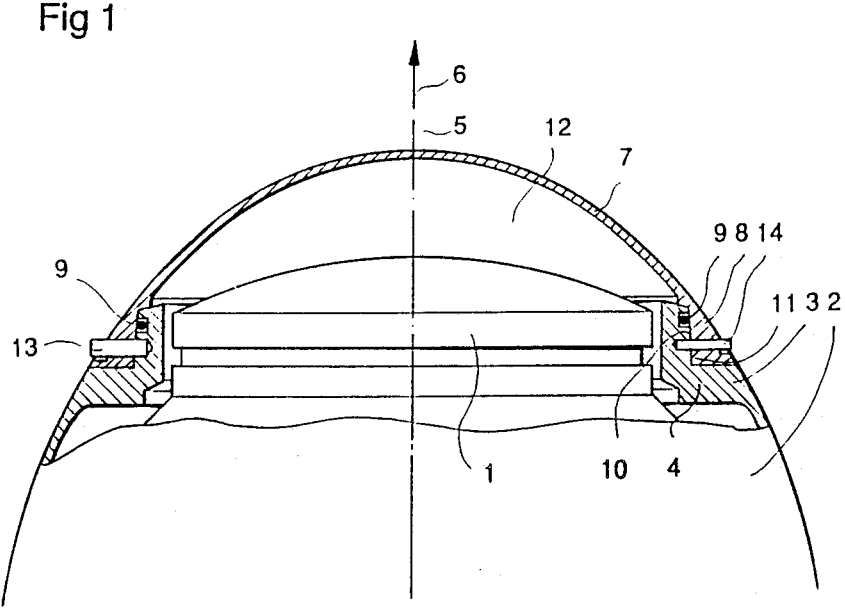

In the drawing an air vehicle, in this case a missile, is indicated by 2. The vehicle is provided with a sensor means 1 disposed in the front of the missile, in this case symmetrically about an axis 5. The active direction of the sensor means is represented by an arrow 6. This is the "direction of vision" of the sensor means. In the missile a support 3 is attached, with a first flange means 4 symmetrically including the sensor means. A cap 7 provided with a second flange means 8 is arranged to protect the sensor means. A flexible sealing or tightening means 9, e.g. in the form of a ring of rubber or other elastomer, or a spring-loaded tightening means having other construction is arranged in a ring-shaped recess in the first flange means 4, tightening or sealing against the limiting surface 11 of the second flange means 8. Thereby, a substantially gastight space 12 is created, partly limited by the cap and including the sensor means. The outer limiting surface of the inner flange means 4 is formed as a frustum of a cone, converging in the active direction 6, and the inner limiting surface of the second flange means 8 is also formed as a frustum of a cone, converging in the same direction.

Diametrically positioned in the protection device there is a first shear pin 13 with a relatively coarse or large diameter and a second shear pin 14 with a relatively small diameter, both made of the same material, e.g. aluminum, with their directions substantially perpendicular to said axis 5 in recesses in the first and the second flange means 4 and 8, respectively.

A gas pressure that acts with a compressive force on the inside of the cap 7 relative to the missile can now be achieved at the desired moment by means of a source of gas, not shown, so that the cap is first brought to break the second shear pin and then to perform an accelerating movement relative to the sensor means with a component of movement in the active direction 6 and a component of movement perpendicular to the active direction 6 until the first shear pin too is broken, and the cap is released from the missile.

The invention may be embodied in other specific forms without departing from the spirit or essential characteristics thereto. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A protection device for sensor means having an active sensing direction carried by a vehicle such as a missile, characterized in that said device comprises a support carried by said vehicle with first flange means surrounding said sensor means about an axis disposed along said active sensing direction of the sensor means, further comprising a cap protecting the sensor means, said cap having second flange means, flexible sealing means disposed between said first and second flange means, said sealing means being arranged to create a seal between adjacent surfaces of said flange means to create a substantially gastight space partly defined by said cap and including the sensor means, at least one attaching means extending between said first and second flange means and arranged so that gas pressure generated within said space forces the cap to move relative to the sensor means with a component of movement in said active sensing direction and at least one component of movement perpendicular to said active sensing direction before said cap is released from said vehicle, the limiting surfaces of said flange means being so formed as to permit said movement.

2. A protection device according to claim 1, characterized in that at least one of the adjacent surfaces of said flange means for at least a portion of its circumference is generated by a line inclined relative to said axis.

3. A protection device according to claim 1, characterized in that at least one of the adjacent surfaces of said flange means for at least a portion of its circumference is generated by a non-linear line.

4. A protection device according to claim 1 characterized in that at least one surface has the form of the inner or outer side of a frustum of a cone.

5. A protection device according to claim 1 characterized in that at least two attaching means are diametrically arranged in the form of first and second shear pins in recesses in said first and second flange means, respectively, with their directions substantially perpendicular to said axis, the first shear pin having substantially higher resistance to shearing than the second shear pin.

6. A protection device according to claim 1 characterized in that said surfaces have such a dimension in said active sensing direction and said sealing means is so arranged that said cap is permitted an acceleration movement relative to said vehicle before being released from it.

* * * * *